United States Patent
Katsura et al.

(10) Patent No.: US 11,338,812 B2
(45) Date of Patent: May 24, 2022

(54) VEHICLE CONTROL DEVICE (71) Applicants: TOYOTA JIDOSHA KABUSHIKI KAISHA, Toyota (JP); DENSO CORPORATION, Kariya (JP)

(72) Inventors: Yoichiro Katsura, Susono (JP); Yoshinori Watanabe, Isehara (JP); Takaaki Tanaka, Susono (JP); Tadashi Omachi, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 369 days.

(21) Appl. No.: 16/288,762

(22) Filed: Feb. 28, 2019

(65) Prior Publication Data

US 2019/0270453 A1 Sep. 5, 2019

(30) Foreign Application Priority Data

Mar. 2, 2018 (JP) .............................. JP2018-037115

(51) Int. Cl.
*B60W 30/18* (2012.01)
*B60Q 1/34* (2006.01)
*G05D 1/02* (2020.01)

(52) U.S. Cl.
CPC ......... *B60W 30/18163* (2013.01); *B60Q 1/34* (2013.01); *B60W 2552/00* (2020.02); *B60W 2554/00* (2020.02); *B60W 2554/804* (2020.02); *G05D 1/0214* (2013.01); *G05D 2201/0213* (2013.01)

(58) Field of Classification Search
CPC ..... B60W 30/18163; B60W 2554/804; B60W 2552/00; B60W 2554/00; B60Q 1/34; G05D 1/0214; G05D 2201/0213
See application file for complete search history.

(56) References Cited

U.S. PATENT DOCUMENTS

| 10,414,395 | B1* | 9/2019 | Sapp ...................... G01S 13/00 |
| 10,671,076 | B1* | 6/2020 | Kobilarov ............ G05D 1/0255 |
| 2002/0027503 | A1* | 3/2002 | Higuchi ............... G05D 1/0257 340/436 |
| 2017/0080940 | A1* | 3/2017 | Ito ........................ B60W 30/16 |
| 2017/0153639 | A1* | 6/2017 | Stein .................. G06K 9/00805 |
| 2019/0193739 | A1* | 6/2019 | Tokimasa ........ B60W 30/18163 |

FOREIGN PATENT DOCUMENTS

| JP | 2002-307972 A | 10/2002 |
| JP | 2016-147556 A | 8/2016 |
| JP | 2017-132408 A | 8/2017 |

* cited by examiner

*Primary Examiner* — Hussein Elchanti
(74) *Attorney, Agent, or Firm* — Sughrue Mion, PLLC (57) ABSTRACT

The vehicle control device recognizes an object around an own-vehicle and acquires information related to a road shape ahead of the own-vehicle. The vehicle control device detects, when a road shape prompting cut-in to an own-lane is acquired, a monitoring target vehicle likely to be prompted to cut into the own-lane among the recognized objects. The vehicle control device executes an evasive preparation for cut-in of the monitoring target vehicle when the monitoring target vehicle is detected. The vehicle control device executes an evasive action to avoid interference between the monitoring target vehicle and the own-vehicle when a predetermined motion from which cut-in of the monitoring target vehicle to the own-lane is expected is sensed after the evasive preparation is executed.

14 Claims, 8 Drawing Sheets

VEHICLE CONTROL DEVICE

CROSS-REFERENCE TO RELATED APPLICATION

The present application claims priority under 35 U.S.C. § 119 to Japanese Patent Application No. 2018-037115, filed Mar. 2, 2018. The contents of this application are incorporated herein by reference in their entirety.

BACKGROUND

Field

The present disclosure relates to a vehicle control device, and particularly relates to a vehicle control device preferably used for a vehicle capable of autonomously traveling on a road that allows lane change.

Description of Related Art

JP 2017-132408 A discloses a technology related to vehicle control when there is a merging vehicle cutting into a driving lane from a merging lane at a merging place where the merging lane merges with the driving lane on which an own-vehicle is traveling.

According to the conventional technology disclosed in JP 2017-132408 A, the degree of deceleration of the own-vehicle necessary for smooth merging when it is assumed that the merging vehicle is traveling at a constant speed is compared with the degree of deceleration of the merging vehicle necessary for smooth merging when it is assumed that the own-vehicle is traveling at a constant vehicle speed. Then, action determination of whether the own-vehicle should travel ahead of the merging vehicle is performed based on a result of the comparison.

SUMMARY

In various scenes, another vehicle cuts into the own-lane. However, in the conventional technology disclosed in Patent Literature 1, the only cut-in scene is the merging place between a driving lane and a merging lane. Patent Literature 1 does not disclose action determination corresponding to a scene in which another vehicle cuts in at a place other than the merging place between a driving lane and a merging lane.

In one method of action determination, for example, an evasive action such as deceleration control is started based on change of the lateral position of another vehicle traveling near the own-vehicle. However, when the other vehicle moves from a merging lane to a bifurcating lane across a main lane or moves from a distant lane to, for example, an entrance to a junction, the lateral position relative to the own-vehicle changes fast, and the change amount is large. Thus, the evasive action needs to be performed abruptly unless cut-in of the other vehicle to the own-lane is estimated early.

An example of the present disclosure is intended to provide a vehicle control device capable of avoiding interference with another vehicle cutting in from another lane to an own-lane.

A vehicle control device according to an example of the present disclosure includes an object recognition unit, a road shape information acquisition unit, a monitoring target vehicle detection unit, an evasive preparation execution unit and an evasive action execution unit.

The object recognition unit is configured to recognize an object around an own-vehicle.

The road shape information acquisition unit configured to acquire information related to a road shape ahead of the own-vehicle.

The monitoring target vehicle detection unit is configured to detect, when a road shape prompting cut-in to an own-lane is acquired by the road shape information acquisition unit, a monitoring target vehicle likely to be prompted to cut into the own-lane among objects recognized by the object recognition unit.

The evasive preparation execution unit is configured to execute an evasive preparation for cut-in of the monitoring target vehicle when the monitoring target vehicle is detected by the monitoring target vehicle detection unit.

The evasive action execution unit is configured to execute an evasive action to avoid interference between the monitoring target vehicle and the own-vehicle when a predetermined motion from which cut-in of the monitoring target vehicle to the own-lane is expected is sensed after the evasive preparation is executed. There are cases where cut-in of another vehicle to an own-lane is prompted by road shape. According to the vehicle control device configured as described above, if another vehicle likely to be prompted to cut into the own-lane is detected when such a rode shape likely to prompt cut-in exists ahead on the own-lane, the evasive preparation is first executed. The evasive action is executed when a motion from which cut-in of the other vehicle to the own-lane is expected is sensed after the evasive preparation is executed. Through these actions at two stages, it is possible to avoid interference between the other vehicle cutting in and the own-vehicle without providing discomfort to a passenger due to an early evasive action or an abrupt evasive action.

The road shape information acquisition unit may extract, as the road shape prompting cut-in to an own-lane, a road shape in which the own-lane bifurcates from a main lane ahead. In this case, the monitoring target vehicle detection unit may detect, as the monitoring target vehicle, a vehicle traveling in a detection region set on an adjacent lane or a lane next to the adjacent lane with reference to the own-vehicle. The evasive action execution unit may sense, as the predetermined motion from which cut-in of the monitoring target vehicle to the own-lane is expected, flashing of a direction indicator of the monitoring target vehicle.

The road shape information acquisition unit may extract, as the road shape prompting cut-in to an own-lane, a road shape in which a merging lane and a bifurcating lane are connected with the own-lane interposed between the merging lane and the bifurcating lane. In this case, the monitoring target vehicle detection unit may detect, as the monitoring target vehicle, a vehicle traveling on the merging lane and capable of reaching a bifurcation point of the bifurcating lane earlier than the own-vehicle. Further, the evasive action execution unit may sense, as the predetermined motion from which cut-in of the monitoring target vehicle to the own-lane is expected, acceleration of the monitoring target vehicle on the merging lane to a vehicle speed faster than the vehicle speed of the own-vehicle. The evasive action execution unit may sense, as the predetermined motion from which cut-in of the monitoring target vehicle to the own-lane is expected, traveling of the monitoring target vehicle on the merging lane at a vehicle speed faster than the vehicle speed of another vehicle on the merging lane.

The vehicle control device according to an example of the present disclosure may further include a side-by-side running avoidance control unit configured to control, when another vehicle staying in a side-by-side running determination region set on an adjacent lane for a side-by-side running determination time or longer is detected, driving of the own-vehicle to avoid side-by-side running with the other vehicle. In the case where the vehicle control device includes the side-by-side running avoidance control unit, the evasive preparation execution unit may execute, as the evasive preparation, increase of the side-by-side running determination region in a lane direction of the adjacent lane and reduction of the side-by-side running determination time when the monitoring target vehicle is detected by the monitoring target vehicle detection unit. Also, the evasive action execution unit may sense, as the predetermined motion from which cut-in of the monitoring target vehicle to the own-lane is expected, staying of the monitoring target vehicle in the side-by-side running determination region for the side-by-side running determination time or longer.

As described above, a vehicle control device according to the present invention executes an evasive preparation first when likelihood of cut-in of another vehicle to an own-lane is estimated from a road shape ahead of an own-vehicle, and then executes an evasive action when a motion from which cut-in of the other vehicle to the own-lane is expected is actually sensed. Through these actions at two stages, it is possible to avoid interference between the other vehicle cutting in and the own-vehicle without providing discomfort to a passenger due to an early evasive action or an abrupt evasive action, thereby maintaining smooth traffic.

DESCRIPTION OF EMBODIMENTS

The following describes embodiments of the present invention with reference to the accompanying drawings. However, when a value such as the number, quantity, amount, or range of each element is stated below in the embodiments, the present disclosure is not limited to the stated value except for a case in which the value is clearly indicated and a case in which the value is clearly specified in principle. In addition, an element such as a structure or a step described below in the embodiments is not necessarily essential to the present disclosure except for a case in which the element is clearly indicated and a case in which the element is clearly specified in principle.

1. First Embodiment 1-1. Vehicle Configuration

A vehicle control device according to the embodiment of the present invention achieves, for example, an automated driving level of Level 2 or higher in level definition by Society of Automotive Engineers (SAE). The vehicle control device according to the embodiment of the present invention is included in a vehicle having a schematic configuration illustrated in FIG. 1.

Figure 1:
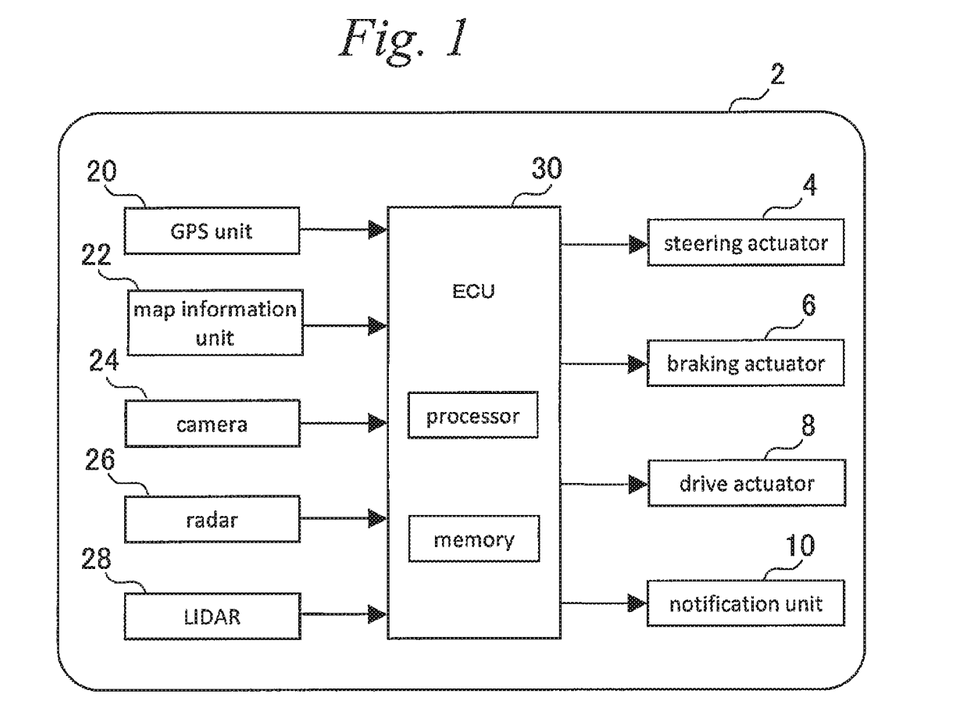
FIG. 1 is a view illustrating a schematic configuration of a vehicle in which a vehicle control device according to the first embodiment of the present disclosure is included.

As illustrated in FIG. 1, a vehicle 2 includes, as an acquirer of information for automated driving, a GPS unit 20, a map information unit 22, a camera 24, a radar 26, and an LIDAR 28. These components are electrically connected with an electronic control unit (hereinafter referred to as ECU) 30 as the vehicle control device.

The GPS unit 20 acquires position information indicating the current position of an own-vehicle based on GPS signals. The ECU 30 can determine the current position of the vehicle 2 based on the position information provided from the GPS unit 20. The map information unit 22 is achieved in, for example, a storage such as an HDD or an SSD mounted on the vehicle. Map information stored in the map information unit 22 includes various kinds of information such as the position, shape, and lane structure of a road.

The camera 24 transmits, to the ECU 30, image information obtained through image capturing of the circumference of the vehicle 2. The ECU 30 performs well-known image processing on the image information transmitted from the camera 24 to recognize other vehicles around the vehicle 2 and road boundary lines including white lines. The radar 26 is a milliwave radar device mounted on the vehicle 2. The radar 26 transmits, to the ECU 30, other-vehicle information reflecting the position and speed of another vehicle relative to the vehicle 2. The LIDAR 28 is a laser imaging detection and ranging (LIDAR) device mounted on the vehicle 2. The LIDAR 28 transmits, to the ECU 30, other-vehicle information reflecting at least the position of another vehicle relative to the vehicle 2. The ECU 30 recognizes the relative position and relative speed of another vehicle or another object around the vehicle 2 based on the other-vehicle information transmitted from the radar 26 and the LIDAR 28.

The camera 24, the radar 26, and the LIDAR 28 are autonomous sensors configured to acquire information related to the situation outside the vehicle 2. The vehicle 2 includes, separately from these autonomous sensors 24, 26, and 28, a vehicle sensor (not illustrated) configured to acquire information related to the motion state of the vehicle 2. Examples of the vehicle sensor include a speed sensor configured to measure the traveling speed of the vehicle based on the rotational speed of a wheel, an acceleration sensor configured to measure the degree of acceleration acting on the vehicle, a yaw rate sensor configured to measure the rotational angular velocity of the vehicle, and a steering angle sensor configured to measure the steering angle.

The vehicle 2 includes a steering actuator 4 configured to steer the vehicle 2, a braking actuator 6 configured to decelerate the vehicle 2, and a drive actuator 8 configured to accelerate the vehicle 2. Examples of the steering actuator 4 include a power steering system, a steer-by-wire steering system, and a rear-wheel steering system. Examples of the braking actuator 6 include a hydraulic pressure brake, and an electrical power regenerative brake. Examples of the drive actuator 8 include an engine, an EV system, a hybrid system, and a fuel battery system.

The vehicle 2 includes a notification unit 10. The notification unit 10 is, for example, a display device visually recognizable from the outside, such as a direction indicator or a brake lamp. The notification unit 10 notifies information related to action determination of the vehicle 2 to other vehicles positioned around the vehicle 2 based on a control command value transmitted from the ECU 30.

The ECU 30 includes at least one processor and at least one memory. The memory stores various kinds of data including a map and various computer programs. Various functions of the ECU 30 are achieved when the computer programs stored in the memory are read and executed by the processor. The ECU 30 serving as the vehicle control device may be a set of a plurality of ECUs.

1-2. Functions of ECU as Vehicle Control Device
1-2-1. Details of ECU Functions

Figure 2:
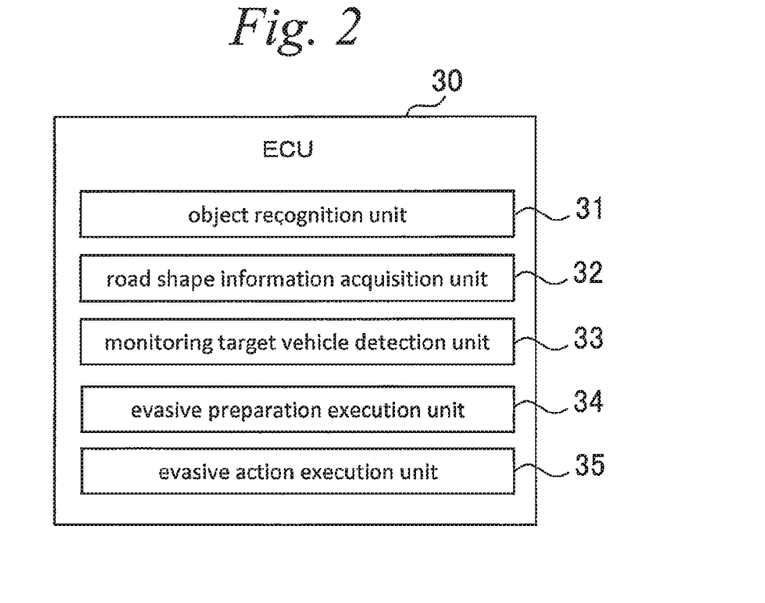
FIG. 2 is a block diagram illustrating part of the functions of the ECU as the vehicle control device according to the first embodiment of the present disclosure.

FIG. 2 is a block diagram illustrating part of functions of the ECU 30 as the vehicle control device according to the present embodiment. FIG. 2 illustrates, in blocks, functions extracted from among various functions of the ECU 30 and related to avoidance of interference with another vehicle cutting into the own-lane from another lane. The ECU 30 as the vehicle control device functions as an object recognition unit 31, a road shape information acquisition unit 32, a monitoring target vehicle detection unit 33, an evasive preparation execution unit 34, and an evasive action execution unit 35. However, these units are not provided as hardware in the ECU 30 but are achieved as software when the computer programs stored in the memory is executed by the processor. The other various functions of the ECU 30 are not illustrated. The following describes the functions of the ECU 30 as the vehicle control device with reference to drawings.

The object recognition unit 31 recognizes an object around the own-vehicle based on information from the camera 24, the radar 26, or the LIDAR 28. The object recognition may be performed based on information from any one of these autonomous sensors 24, 26, and 28, or may be performed by sensor fusion in which information from a plurality of the autonomous sensors 24, 26, and 28 is combined. The object recognition determines the type of an object, for example, whether the object is a moving object or a stationary object. When the object is a moving object, the position and speed thereof are calculated. The position and speed of a moving object are calculated in, for example, a reference coordinate system with the own-vehicle as the origin, the width direction of the own-vehicle as the horizontal axis, and the traveling direction thereof as the vertical axis.

The road shape information acquisition unit 32 acquires information related to a road shape ahead of the own-vehicle. The road shape information can be acquired by using the map information acquired from the map information unit 22 and the image information acquired from the camera 24. For example, the map information may be used as main information, and the image information may be used as a backup. The road shape information acquisition unit 32 processes the acquired road shape information to extract a specific road shape. The specific road shape extracted by the road shape information acquisition unit 32 will be specifically described below with reference to FIGS. 3 and 4.

Figure 3:
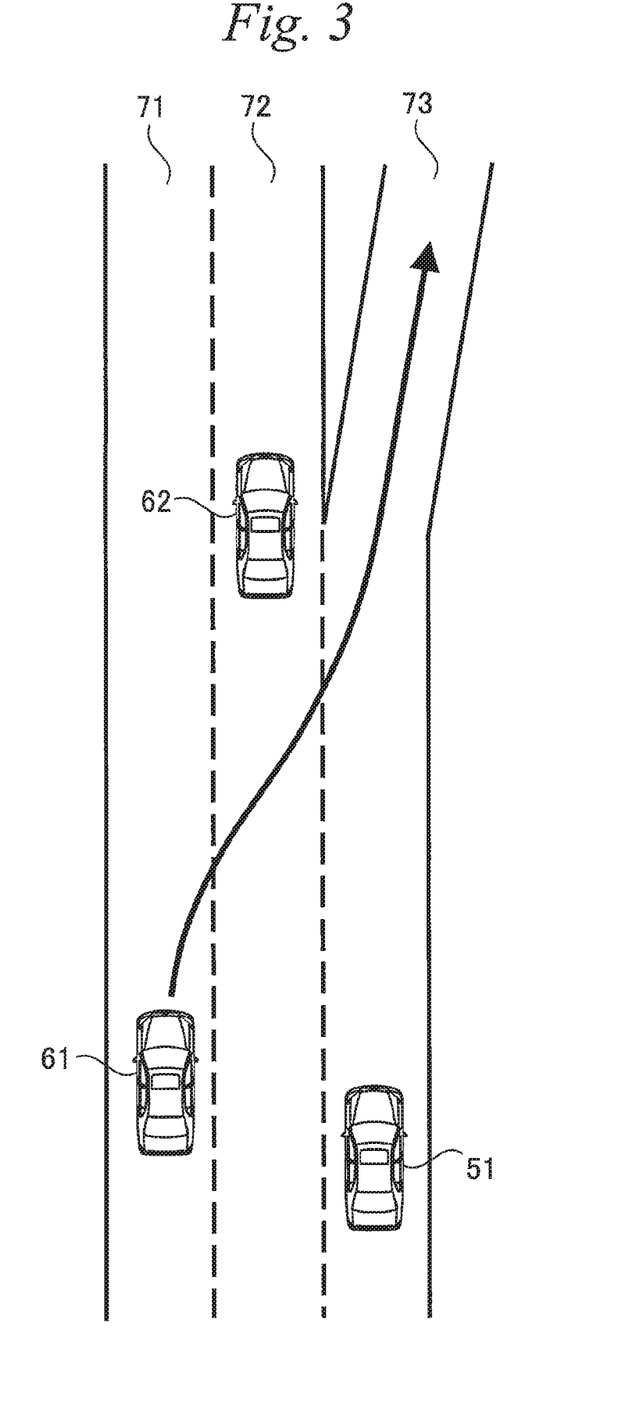
FIG. 3 is a view illustrating an example of rode shapes extracted, as a specific rode shape by the vehicle control device according to the present disclosure.

FIG. 3 illustrates a road including three lanes of a first driving lane 71, a second driving lane 72, and a third driving lane 73 on one side. Among three lanes, the first driving lane 71 and the second driving lane 72 are a main lane, and the third driving lane 73 is a bifurcating lane from the main lane. An own-vehicle 51 is traveling on the third driving lane 73 before a bifurcation point where the third driving lane 73 bifurcates from the main lane. The road shape information acquisition unit 32 extracts, as the specific road shape, the road shape in which the own-lane (third driving lane 73) bifurcates from the main lane (the first driving lane 71 and the second driving lane 72) ahead as illustrated in FIG. 3. Specific examples of such a road shape include an exit from an automobile dedicated road, an entrance to a service area (SA) or a parking area (PA), and an entrance to a junction (JCT).

Figure 4:
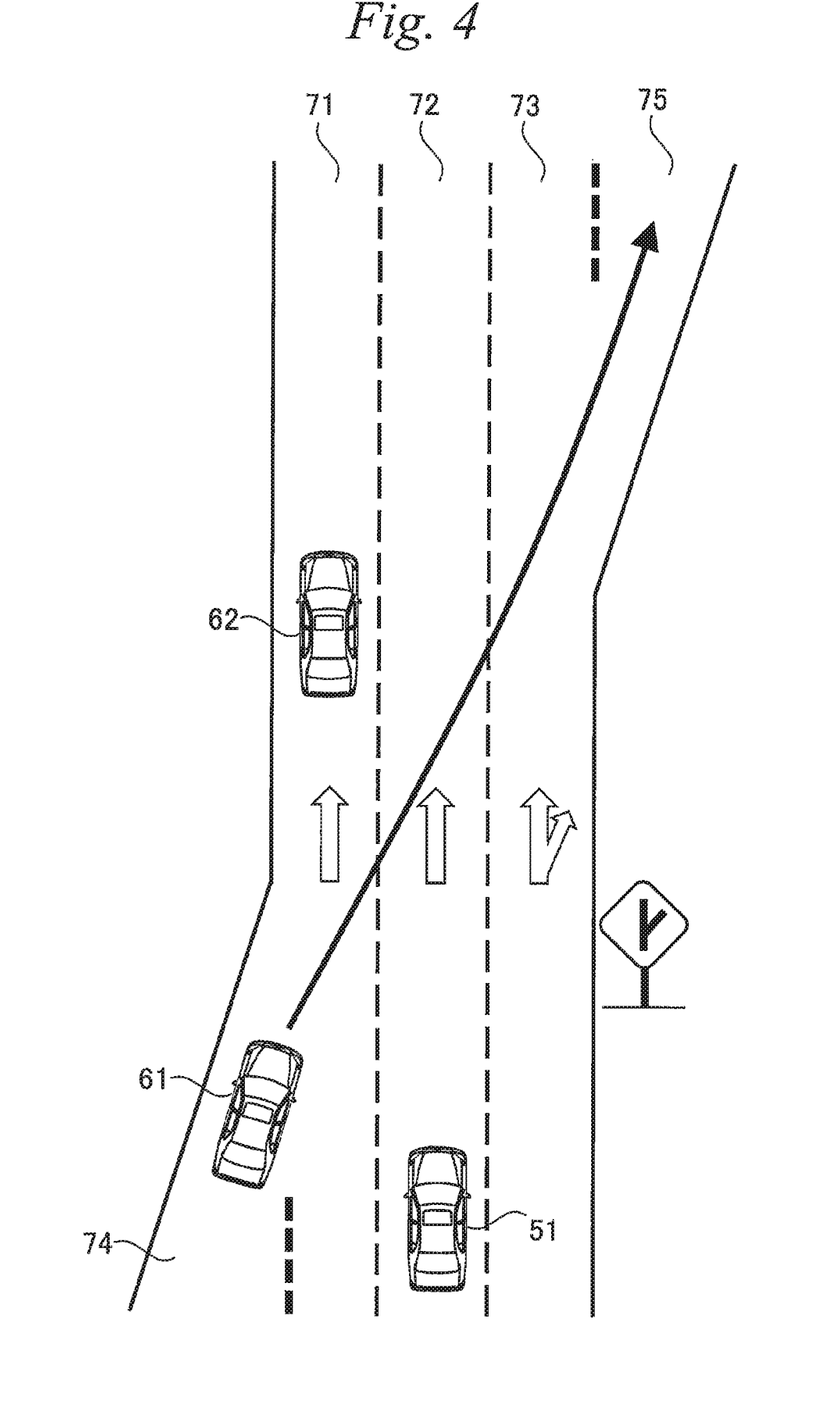
FIG. 4 is a view illustrating an example of rode shapes extracted, as a specific rode shape by the vehicle control device according to the present disclosure.

FIG. 4 illustrates a main lane including the three lanes of the first driving lane 71, the second driving lane 72, and the third driving lane 73 on one side, a merging lane 74 to the first driving lane 71, and a bifurcating lane 75 from the third driving lane 73. A bifurcation point where the bifurcating lane 75 bifurcates from the third driving lane 73 is positioned ahead of a merging point where the merging lane 74 merges to the first driving lane 71. The own-vehicle 51 is traveling on the second driving lane 72 before the merging point where the merging lane 74 merges to the main lane. The road shape information acquisition unit 32 extracts, as the specific road shape, a road shape in which the merging lane 74 and the bifurcating lane 75 are connected with the own-lane with the own-lane (second driving lane 72) interposed therebetween and the distance from the merging point to the bifurcation point is in a defined range as illustrated in FIG. 4. Specific examples of such a road shape include a road shape in which an exit from an automobile dedicated road, an entrance to a service area (SA) or a parking area (PA), or an entrance to a junction (JCT) is provided on a side opposite to the merging lane.

In the road shape illustrated in FIG. 3, another vehicle 61 traveling on the main lane (first driving lane 71) is likely to cut in front of the own-vehicle 51 when changing lanes to the own-lane 73 as the bifurcating lane. In the road shape illustrated in FIG. 4, the other vehicle 61 is likely to cut in front of the own-vehicle 51 when obliquely running from the merging lane 74 to the bifurcating lane 75 across the main lane including the own-lane 72. Thus, the road shapes illustrated in FIGS. 3 and 4 are each a road shape prompting cut-in of another vehicle to an own-lane. The road shape information acquisition unit 32 extracts such a road shape as the specific road shape.

When the specific road shape is acquired by the road shape information acquisition unit 32, the monitoring target vehicle detection unit 33 detects a monitoring target vehicle among objects recognized by the object recognition unit 31. The vehicle detected as the monitoring target vehicle is a vehicle likely to be prompted to cut into the own-lane by the specific road shape. Which vehicle is detected as the monitoring target vehicle is determined depending on the kind of the specific road shape. The following specifically describes the monitoring target vehicle detected by the monitoring target vehicle detection unit 33 with reference to FIGS. 3 and 4.

In a case of the specific road shape illustrated in FIG. 3, the monitoring target vehicle detection unit 33 sets a detection region on the main lane side of the own-vehicle 51. The detection region includes the adjacent lane 72 to the own-lane 73 and the lane 71 next to the adjacent lane 72. The detection region is finite in the flow direction of the lane, and has a length of a plurality of vehicles from a position right beside the own-vehicle 51 to a front position. However, the detection region is set in a range from a position before the bifurcation point by a predetermined distance to the bifurcation point. In the example illustrated in FIG. 3, the vehicle 61 traveling at a position diagonally in front of the vicinity of the own-vehicle 51 is detected as the monitoring target vehicle, but a vehicle 62 traveling at a position far ahead of the own-vehicle 51 is not detected as the monitoring target vehicle.

In a case of the specific road shape illustrated in FIG. 4, the monitoring target vehicle detection unit 33 detects the vehicle 61 traveling on the merging lane 74, and determines whether the vehicle 61 is likely to reach the bifurcation point of the bifurcating lane 75 earlier than the own-vehicle 51. When preceding the own-vehicle 51, the vehicle 61 is highly likely to reach the bifurcation point earlier than the own-vehicle 51. When the vehicle 61 is travelling side by side with the own-vehicle 51, the vehicle 61 is likely to reach the bifurcation point earlier than the own-vehicle 51 through acceleration. When the vehicle 61 is positioned behind the own-vehicle 51 but the distance from the own-vehicle 51 is in a predetermined range, the vehicle 61 is likely to reach the bifurcation point earlier than the own-vehicle 51 through acceleration. In the example illustrated in FIG. 4, the vehicle 61 travelling on the merging lane 74 is detected as the monitoring target vehicle, but the vehicle 62 traveling on the main lane (first driving lane 71) is not detected as the monitoring target vehicle.

When the monitoring target vehicle is detected by the monitoring target vehicle detection unit 33, the evasive preparation execution unit 34 executes an evasive preparation for cut-in of the monitoring target vehicle. When a predetermined motion of the monitoring target vehicle is sensed after the evasive preparation is executed, the evasive action execution unit 35 executes an evasive action to avoid interference between the monitoring target vehicle and the own-vehicle. The motion of the monitoring target vehicle sensed by the evasive action execution unit 35 is a motion from which cut-in of the monitoring target vehicle to the own-lane is expected. From which motion cut-in of the monitoring target vehicle to the own-lane is expected is determined depending on the kind of the specific road shape as described below.

In a case of the specific road shape illustrated in FIG. 3, the evasive action execution unit 35 senses flashing of the direction indicator of the monitoring target vehicle 61. Flashing of the direction indicator is a motion from which cut-in of the monitoring target vehicle 61 to the own-lane 73 is expected. In a case of the specific road shape illustrated in FIG. 4, the evasive action execution unit 35 senses acceleration of the monitoring target vehicle 61 on the merging lane 74 to a vehicle speed faster than that of the own-vehicle 51. The evasive action execution unit 35 also senses traveling of the monitoring target vehicle 61 on the merging lane 74 at a vehicle speed faster than that of another vehicle on the merging lane 74. Both motions are motions from which cut-in of the monitoring target vehicle 61 to the own-lane 73 is expected.

The following describes specific contents of each of the evasive preparation and the evasive action. The content of the evasive action is determined based on the kind of the specific road shape. In a case of the specific road shape illustrated in FIG. 3, the evasive action execution unit 35 executes deceleration of the own-vehicle as the evasive action. In a case of the specific road shape illustrated in FIG. 4, the evasive action execution unit 35 executes, as the evasive action, deceleration of the own-vehicle or lane change through a steering operation. However, in both cases, acceleration of the own-vehicle may be performed as the evasive action, depending on the positional and speed relation with the monitoring target vehicle.

The content of the evasive preparation is determined based on the content of the evasive action. When the evasive action is deceleration of the own-vehicle, the evasive preparation is, for example, deepening of the position of the brake pad in advance or downshift in advance. The former exemplary preparation enables quick braking when a brake operation is performed, and the latter exemplary preparation increases the effectiveness of engine brake when the accelerator is operated to the returning side. When the evasive action is lane change through a steering operation, the evasive preparation is, for example, steering in the range of play of the steering system in advance, or offsetting in the lateral direction within the own-lane. The former exemplary preparation enables swift change of the direction of the vehicle, and the latter exemplary preparation reduces the time taken for moving to an adjacent lane. When the evasive action is acceleration of the own-vehicle, the evasive preparation is, for example, downshift in advance to improve response to a press of the accelerator.

1-2-2. Avoidance Control

Figure 5:
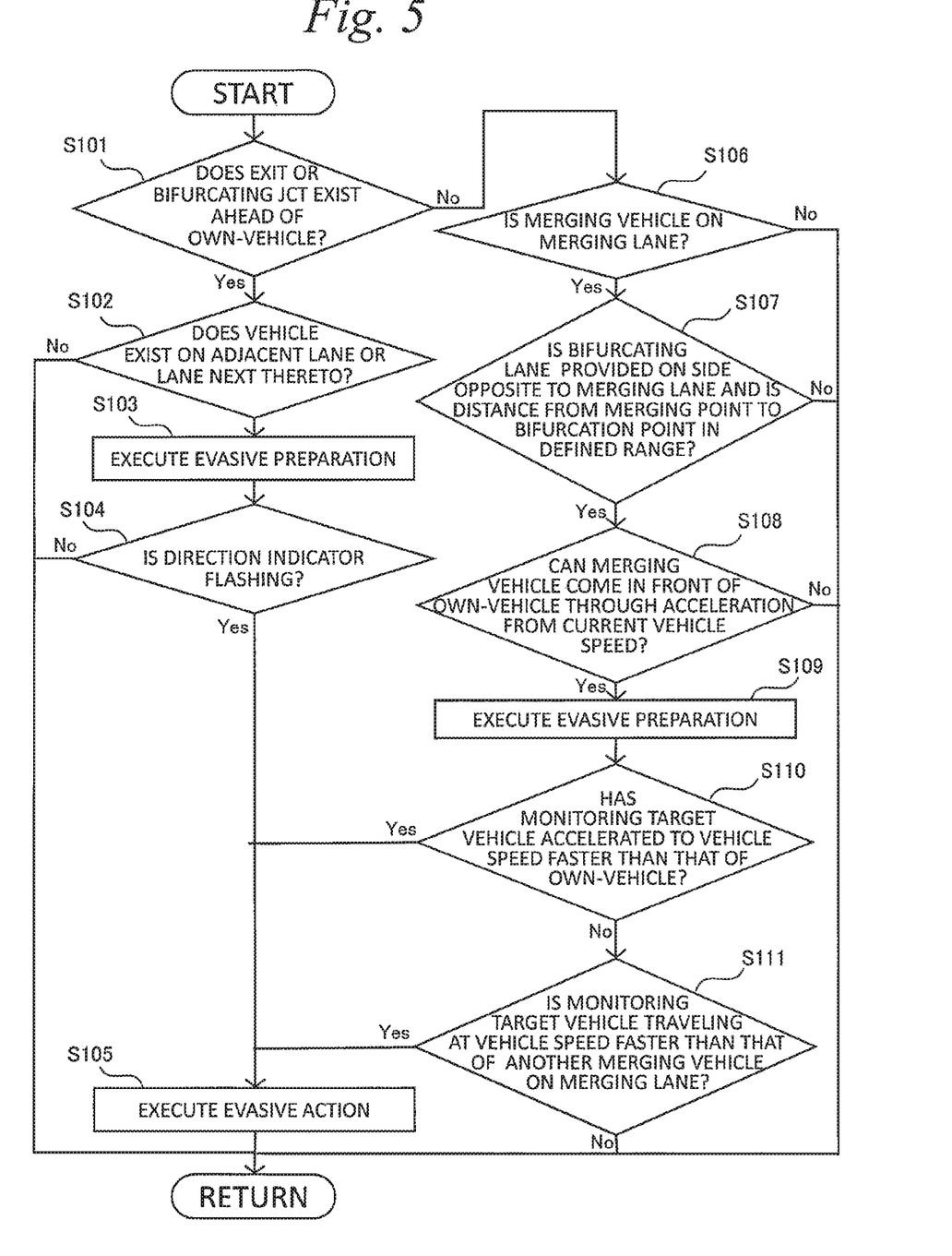
FIG. 5 is a flowchart illustrating a routine of an avoidance control executed by the ECU as the vehicle control device according to the first embodiment of the present disclosure.

The above-described functions of the ECU 30 as the vehicle control device are used in avoidance control for cut-in of another vehicle into an own-lane. FIG. 5 is a flowchart illustrating the routine of the avoidance control executed by the ECU 30. The ECU 30 repeatedly executes the routine illustrated in FIG. 5 in a predetermined control period. The following sequentially describes the contents of the routine of the avoidance control starting at step S101.

At step S101, it is determined whether, for example, an exit or a bifurcating JCT exists ahead on the own-lane. Specifically, it is determined whether the specific road shape as illustrated in FIG. 3 exists ahead on the own-lane.

When a result of the determination at step S101 is positive, the determination at step S102 is performed. At step S102, it is determined whether a vehicle is detected in the detection region set on an adjacent lane or a lane next to the adjacent lane. When the result of the determination at step S102 is negative, the present routine directly ends.

When a result of the determination at step S102 is positive, processing at step S103 is performed. At step S103, the evasive preparation for cut-in of the vehicle (monitoring target vehicle) detected at step S102 is executed. At step S103, for example, a preparation for deceleration of the own-vehicle is executed.

After the evasive preparation is executed at step S103, determination at step S104 is performed. At step S104, it is determined whether the monitoring target vehicle is flashing the direction indicator. When a result of the determination at step S104 is positive, the present routine proceeds to step S105. At step S105, the evasive action corresponding to the evasive preparation executed at step S103 is executed, which ends the present routine. When the result of the determination at step S104 is negative, the present routine ends while the evasive preparation continues.

When the result of the determination at step S101 is negative, determination at step S106 is performed. At step S106, it is determined whether a merging lane exists ahead of the own-vehicle and a merging vehicle is traveling on the merging lane. When the result of the determination at step S106 is negative, the present routine directly ends.

When a result of the determination at step S106 is positive, determination at step S107 is performed. At step S107, it is determined whether a bifurcating lane is provided on a side opposite to the merging lane and the distance from the merging point to the bifurcation point is in a defined range. Specifically, it is determined whether the specific road shape as illustrated in FIG. 4 exists ahead on the own-lane. When the result of the determination at step S107 is negative, the present routine directly ends.

When a result of the determination at step S107 is positive, determination at step S108 is performed. At step S108, it is determined whether the merging vehicle detected at step S106 can come in front of the own-vehicle through acceleration from its current vehicle speed. When the result of the determination at step S108 is negative, the present routine directly ends.

When a result of the determination at step S108 is positive, processing at step S109 is performed. At step S109, an evasive preparation for cut-in of the merging vehicle (monitoring target vehicle) detected at step S106 is executed. At step S109, for example, a preparation for deceleration of the own-vehicle, or a preparation for causing the own-vehicle to change lanes is executed.

After the evasive preparation is executed at step S109, determination at step S110 is performed. At step S110, it is determined whether the monitoring target vehicle on the merging lane has accelerated to a vehicle speed faster than that of the own-vehicle. When a result of the determination at step S110 is positive, the present routine proceeds to step S105. At step S105, the evasive action corresponding to the evasive preparation executed at step S109 is executed, which ends the present routine.

When the result of the determination at step S110 is negative, determination at step S111 is performed. At step S111, it is determined whether the monitoring target vehicle is traveling at a vehicle speed faster than that of another merging vehicle. When a result of the determination at step S111 is positive, the present routine proceeds to step S105. At step S105, the evasive action corresponding to the evasive preparation executed at step S109 is executed, which ends the present routine. When the result of the determination at step S11 is negative, the present routine ends while the evasive preparation continues.

2. Second Embodiment 2-1. Vehicle Configuration

A vehicle to which a vehicle control device according to the present embodiment is applied has a schematic configuration that is identical to that in the first embodiment illustrated in FIG. 1. Thus, description of the vehicle configuration will be omitted.

2-2. Functions of ECU as Vehicle Control Device 2-2-1. Details of ECU Functions

Figure 6:
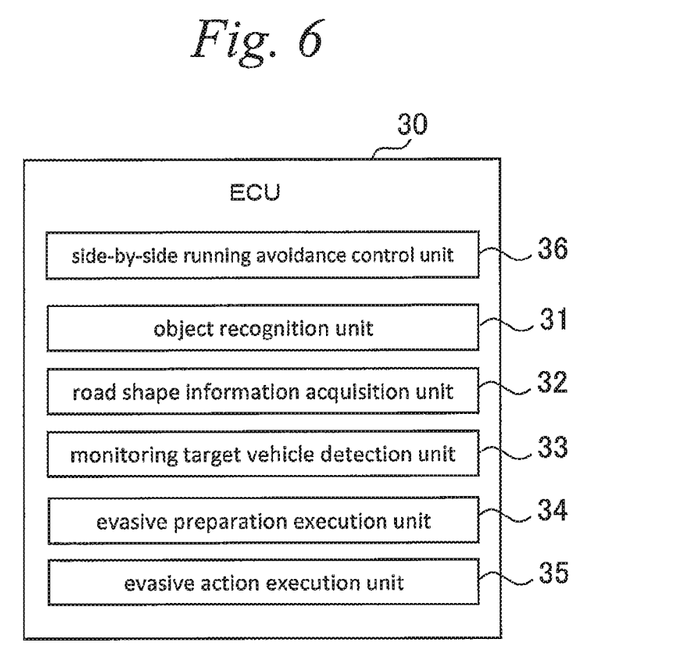
FIG. 6 is a block diagram illustrating part of the functions of the ECU as the vehicle control device according to the second embodiment of the present disclosure.

FIG. 6 is a block diagram illustrating part of the functions of the ECU 30 as the vehicle control device according to the present embodiment. In the present embodiment, the ECU 30 has, in addition to the functions of the ECU 30 in the first embodiment, the function of avoiding side-by-side running with another vehicle traveling on an adjacent lane so that the own-vehicle does not enter a blind spot of the other vehicle. This function is achieved by a side-by-side running avoidance control unit 36 included in the ECU 30.

The side-by-side running avoidance control unit 36 sets the side-by-side running determination region on the adjacent lane with reference to the own-vehicle, and determines whether another vehicle traveling on the adjacent lane is staying in the side-by-side running determination region for a certain time or longer. When another vehicle staying in the side-by-side running determination region for the certain time or longer is detected, the side-by-side running avoidance control unit 36 controls driving of the own-vehicle to avoid side-by-side running with the other vehicle. An action for avoiding side-by-side running may be lane change, deceleration, or acceleration. An optimum action is selected to avoid interference with another vehicle around the own-vehicle. The following describes a specific example of the side-by-side running avoidance control with reference to FIGS. 7 and 8.

Figure 7:
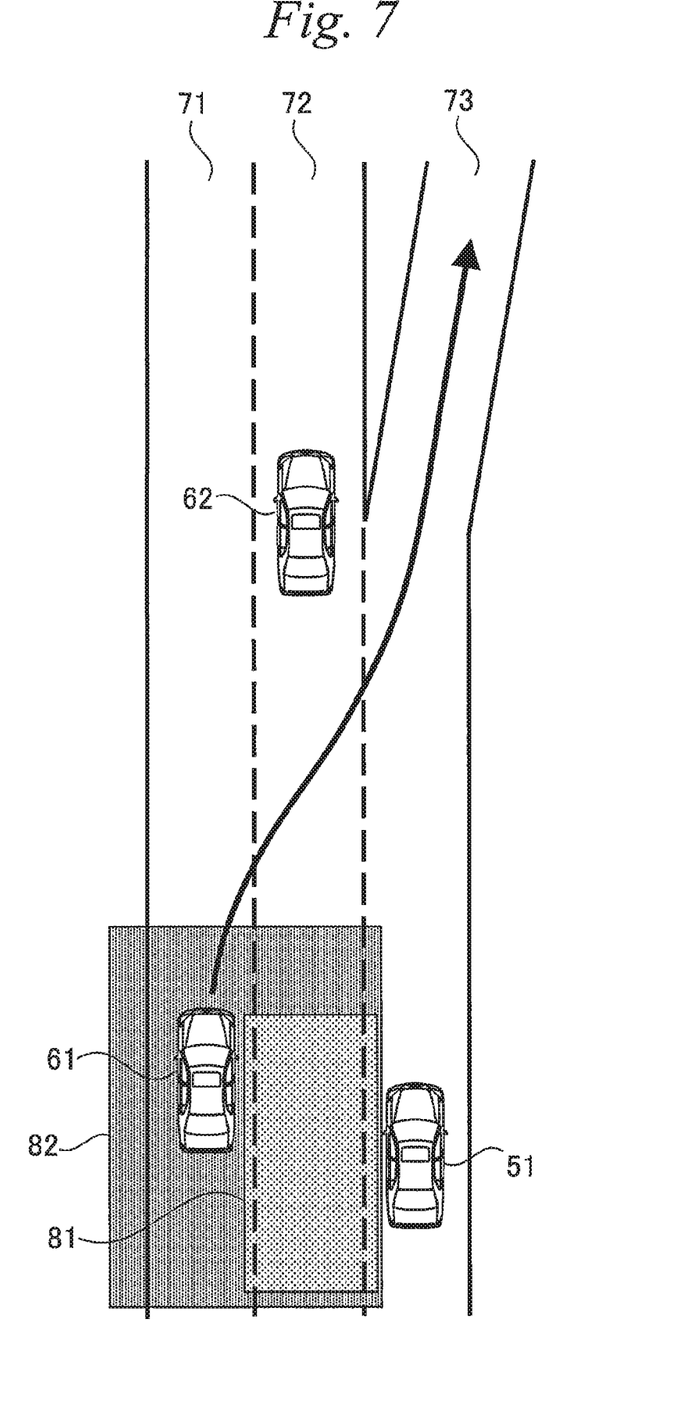
FIG. 7 is a view illustrating an avoidance control executed by the vehicle control device according to the second embodiment of the present disclosure.
Figure 8:
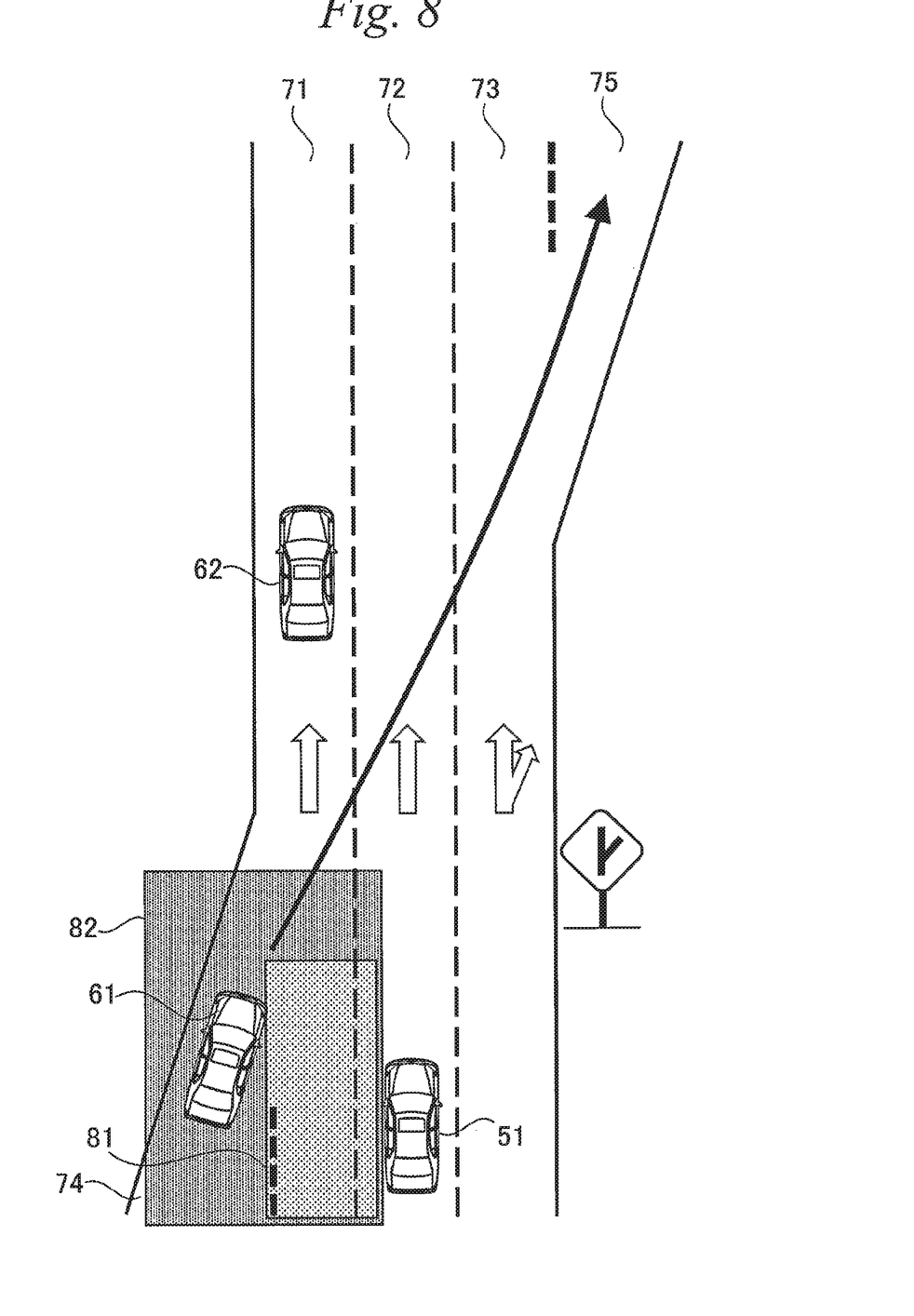
FIG. 8 is a view illustrating an avoidance control executed by the vehicle control device according to the second embodiment of the present disclosure.

FIG. 7 illustrates the side-by-side running determination region set in the specific road shape illustrated in FIG. 3. In the example illustrated in FIG. 7, the side-by-side running determination region is a region 81 surrounded by a rectangle set on the second driving lane 72. FIG. 8 illustrates the side-by-side running determination region set in the specific road shape illustrated in FIG. 4. In the example illustrated in FIG. 8, the side-by-side running determination region is a region 81 surrounded by a rectangle set on the first driving lane 71. In both examples, the side-by-side running determination region 81 includes a position right beside the own-vehicle 51 and has a length of at least one vehicle. When it is sensed that vehicle is staying in the side-by-side running determination region 81 for a predetermined side-by-side running determination time or longer, the side-by-side running avoidance control unit 36 controls driving of the own-vehicle to avoid side-by-side running with the vehicle.

The present embodiment is also characterized in the contents of the evasive preparation by the evasive preparation execution unit 34. In the present embodiment, the evasive preparation execution unit 34 executes, as the evasive preparation, increase of the side-by-side running determination region set in the side-by-side running avoidance control in the lane direction and reduction of the side-by-side running determination time. The present embodiment is also characterized in a condition on execution of an evasive action by the evasive action execution unit 35. The evasive action execution unit 35 senses, as a predetermined motion from which cut-in of the monitoring target vehicle to the own-lane is expected, staying of the monitoring target vehicle in the side-by-side running determination region for the side-by-side running determination time or longer after the above-described evasive preparation is performed by the evasive preparation execution unit 34. The following describes specific examples of the evasive preparation and the evasive action with reference to FIGS. 7 and 8.

In the example illustrated in FIG. 7, the side-by-side running determination region is enlarged from the region 81 including the second driving lane 72 adjacent to the own-lane 73 to a region 82 additionally including the first driving lane 71 next thereto. The enlarged side-by-side running determination region 82 is also enlarged forward in the lane direction as compared to the original side-by-side running determination region 81. In the example illustrated in FIG. 8, the side-by-side running determination region is enlarged from the region 81 including the first driving lane 71 adjacent to the own-lane 72 to a region 82 additionally including the merging lane 74. The enlarged side-by-side running determination region 82 is also enlarged forward in the lane direction as compared to the original side-by-side running determination region 81.

In the examples illustrated in FIGS. 7 and 8, the monitoring target vehicle 61 is in the enlarged side-by-side running determination region 82. The evasive action execution unit 35 senses, as a predetermined motion from which cut-in of the monitoring target vehicle 61 to the own-lane is expected, staying of the monitoring target vehicle 61 in the side-by-side running determination region 82 for the predetermined side-by-side running determination time or longer. However, the side-by-side running determination time used in the determination by the evasive action execution unit 35 is set to be shorter than the side-by-side running determination time used in the determination by the side-by-side running avoidance control unit 36. For the evasive action executed by the evasive action execution unit 35, an optimum operation is selected to avoid interference with another vehicle around the own-vehicle.

2-2-2. Avoidance Control

Figure 9:
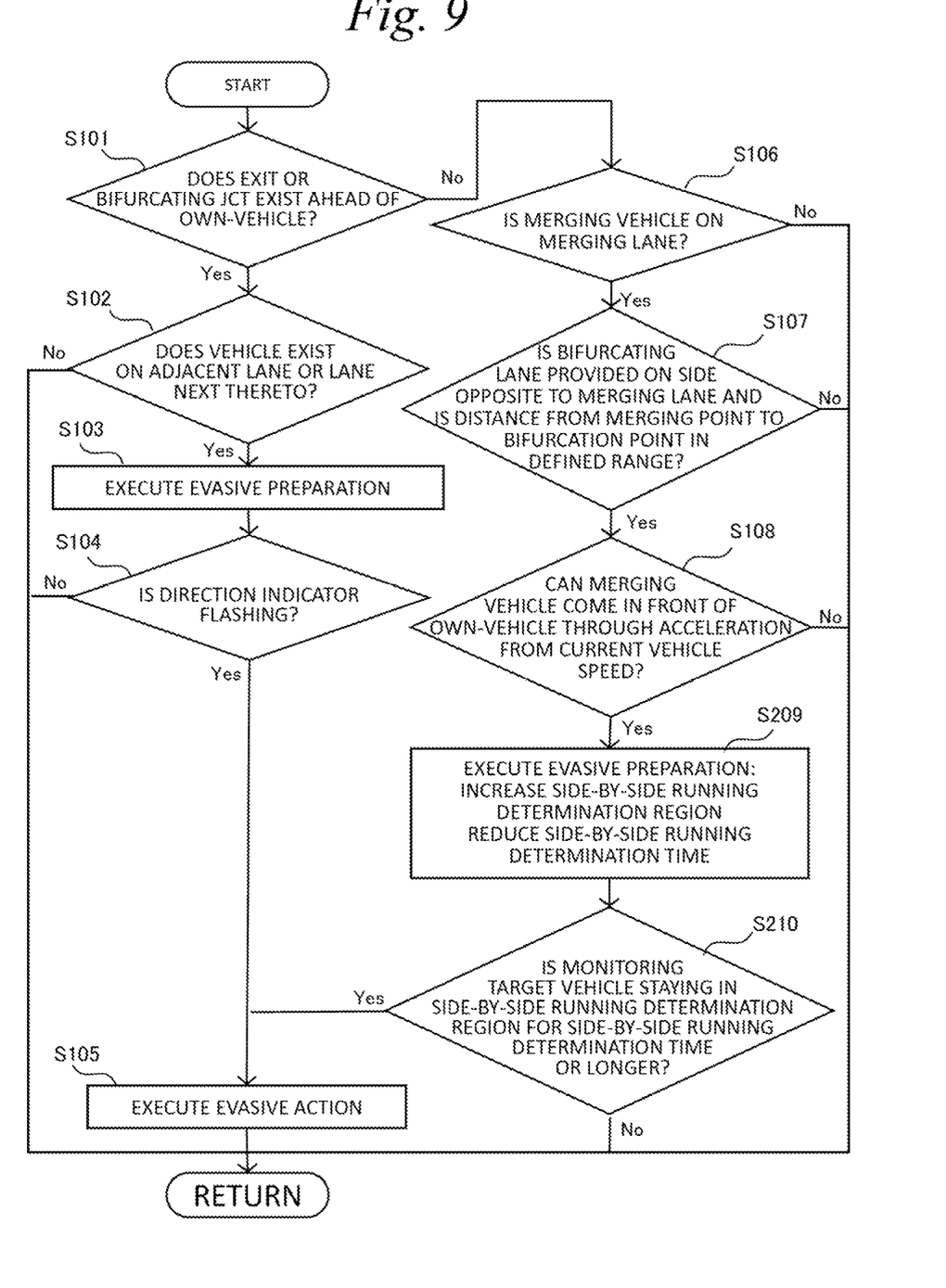
FIG. 9 is a flowchart illustrating a routine of an avoidance control executed by the vehicle control device according to the second embodiment of the present disclosure.

The above-described functions of the ECU 30 as the vehicle control device are used in avoidance control for cut-in of another vehicle from an adjacent lane. FIG. 9 is a flowchart illustrating the routine of avoidance control executed by the ECU 30 in the present embodiment. The ECU 30 repeatedly executes the routine illustrated in FIG. 9 in a predetermined control period. The above-described side-by-side running avoidance control is executed by a routine different from the routine of the avoidance control. The following describes the contents of the routine of the avoidance control according to the present embodiment with focus on difference from the routine of the avoidance control according to the first embodiment.

In the routine of the avoidance control according to the present embodiment, processing at step S209 is performed in place of the processing at step S109 in the routine illustrated in FIG. 5. Determination at step S210 is performed in place of the determination at steps S110 and S111 in the routine illustrated in FIG. 5.

The processing at step S209 is executed when the result of the determination at S108 is positive. At step S209, increase of the side-by-side running determination region and reduction of the side-by-side running determination time are performed as the evasive preparation.

After the evasive preparation is executed at step S209, determination at step S210 is performed. At step S210, it is determined whether the monitoring target vehicle is staying in the side-by-side running determination region for the side-by-side running determination time or longer. When a result of the determination at step S210 is positive, the present routine proceeds to step S105 to execute the evasive action, which ends the present routine. The executed evasive action may be vehicle deceleration, or may be lane changes, depending on the surrounding situation. When the result of the determination at step S210 is negative, the present routine ends while the evasive preparation continues.

What is claimed is:

1. A vehicle control device comprising:
a memory storing one or more instructions;
a processor configured to execute the one or more instructions to:
recognize an object around an own-vehicle;
acquire information related to a road shape ahead of the own-vehicle;
detect, in response to a road shape prompting cut-in to an own-lane being acquired, a monitoring target vehicle likely to be prompted to cut into the own-lane among objects recognized by the processor;
determine an evasive action based on the road shape ahead of the own-vehicle;
determine an evasive preparation based on the determined evasive action;
execute the evasive preparation for cut-in of the monitoring target vehicle based on the monitoring target vehicle being detected; and
execute the evasive action to avoid interference between the monitoring target vehicle and the own-vehicle based on a predetermined motion from which cut-in of the monitoring target vehicle to the own-lane is expected being sensed after the evasive preparation is executed.

2. The vehicle control device according to claim 1, wherein the processor is further configured to extract, as the road shape prompting cut-in to the own-lane, a road shape in which the own-lane bifurcates from a main lane ahead.

3. The vehicle control device according to claim 2, wherein the processor is further configured to detect, as the monitoring target vehicle, a vehicle traveling in a detection region set on an adjacent lane or a lane next to the adjacent lane with reference to the own-vehicle.

4. The vehicle control device according to claim 3, wherein the processor is further configured to sense, as the predetermined motion from which cut-in of the monitoring target vehicle to the own-lane is expected, flashing of a direction indicator of the monitoring target vehicle.

5. The vehicle control device according to claim 1, wherein the processor is further configured to extract, as the road shape prompting cut-in to the own-lane, a road shape in which a merging lane and a bifurcating lane are connected with the own-lane interposed between the merging lane and the bifurcating lane.

6. The vehicle control device according to claim 5, wherein the processor is further configured to detect, as the monitoring target vehicle, a vehicle traveling on the merging lane and capable of reaching a bifurcation point of the bifurcating lane earlier than the own-vehicle.

7. The vehicle control device according to claim 6, wherein the processor is further configured to sense, as the predetermined motion from which cut-in of the monitoring target vehicle to the own-lane is expected, acceleration of the monitoring target vehicle on the merging lane to a vehicle speed faster than a vehicle speed of the own-vehicle.

8. The vehicle control device according to claim 6, wherein the processor is further configured to sense, as the predetermined motion from which cut-in of the monitoring target vehicle to the own-lane is expected, traveling of the monitoring target vehicle on the merging lane at a vehicle speed faster than a vehicle speed of another vehicle on the merging lane.

9. The vehicle control device according to claim 1, wherein the processor is further configured to:
control, based on another vehicle staying in a side-by-side running determination region set on an adjacent lane for a side-by-side running determination time or longer being detected, driving of the own-vehicle to avoid side-by-side running with the other vehicle;
execute, as the evasive preparation, increase of the side-by-side running determination region in a lane direction of the adjacent lane and reduction of the side-by-side running determination time based on the monitoring target vehicle being detected, and
sense, as the predetermined motion from which cut-in of the monitoring target vehicle to the own-lane is expected, staying of the monitoring target vehicle in the side-by-side running determination region for the side-by-side running determination time or longer.

10. The vehicle control device according to claim 1, wherein the processor is further configured to execute, as the evasive action, at least one motion of steering, deceleration, and acceleration.

11. The vehicle control device according to claim 1, wherein the information related to the road shape includes a distance between a merging point of a merging lane and a bifurcating point of a bifurcating lane, and
wherein the processor is further configured to execute the evasive preparation based on the distance between the merging point of the merging lane and the bifurcating point of the bifurcating lane being within a predetermined range and the detection of the monitoring target vehicle likely to be prompted to cut into the own-lane.

12. The vehicle control device according to claim 1, wherein the processor is further configured to:
execute, as the evasive preparation, increase of a side-by-side running determination region in a lane direction of an adjacent lane and reduction of the side-by-side running determination time based on the monitoring target vehicle being detected; and
execute the evasive action based on the monitoring target vehicle being in the side-by-side running determination region for a time greater than or equal to the side-by-side running determination time.

13. A vehicle control device comprising:
a memory storing one or more instructions;
a processor configured to execute the one or more instructions to:
recognize an object around an own-vehicle;
acquire information related to a road shape ahead of the own-vehicle;
detect, based on the road shape ahead of the own-vehicle prompting another vehicle cut into an own-lane being acquired, a monitoring target vehicle likely to be prompted to cut into the own-lane among objects recognized by the processor; and
execute an evasive action to avoid interference between the monitoring target vehicle and the own-vehicle based on a predetermined motion from which cut-in of the monitoring target vehicle to the own-lane is expected being sensed
wherein the information of the road shape includes a distance between a merging point of a merging lane and a bifurcating point of a bifurcating lane, and
wherein the processor is further configured to execute the evasive action based on the distance between the merging point of the merging lane and the bifurcating point of the bifurcating lane being within a predetermined range and the predetermined motion from which cut-in of the monitoring target vehicle to the own-lane is expected being sensed.

14. The vehicle control device according to claim 13, wherein the processor is further configured to:
execute the evasive action based on the monitoring target vehicle being in a side-by-side running determination region for a time greater than or equal to a side-by-side running determination time.

* * * * *